US012005731B2

(12) United States Patent
Maesen

(10) Patent No.: US 12,005,731 B2
(45) Date of Patent: Jun. 11, 2024

(54) LAMINATE PANEL, METHOD FOR MANUFACTURING A LAMINATE PANEL AND PRESS ELEMENT TO REALIZE THE METHOD

(71) Applicant: FLOORING INDUSTRIES LIMITED, SARL, Bertrange (LU)

(72) Inventor: Christophe Maesen, Lichtervelde (BE)

(73) Assignee: UNILIN BV, Wielsbeke (BE)

( * ) Notice: Subject to any disclaimer, the term of this patent is extended or adjusted under 35 U.S.C. 154(b) by 85 days.

(21) Appl. No.: 17/176,499

(22) Filed: Feb. 16, 2021

(65) Prior Publication Data

US 2021/0187997 A1 Jun. 24, 2021

Related U.S. Application Data

(62) Division of application No. 14/390,200, filed as application No. PCT/IB2013/052393 on Mar. 26, 2013, now Pat. No. 10,953,686.

(30) Foreign Application Priority Data

Apr. 3, 2012 (BE) .................................. 2012/0224

(51) Int. Cl.
*B44F 9/02* (2006.01)
*B31F 1/07* (2006.01)
(Continued)

(52) U.S. Cl.
CPC .................. *B44F 9/02* (2013.01); *B31F 1/07* (2013.01); *B44B 5/026* (2013.01); *B44C 1/24* (2013.01);
(Continued)

(58) Field of Classification Search
CPC ... B44F 9/02; B31F 1/07; B44B 5/026; B44C 1/24; B44C 3/085; B44C 5/04; B44C 1/222; Y10T 428/24612
See application file for complete search history.

(56) References Cited

U.S. PATENT DOCUMENTS 6,214,439 B1 4/2001 Meneghin
8,153,234 B2 4/2012 Nollet et al.
(Continued)

FOREIGN PATENT DOCUMENTS

CN 2637142 Y * 9/2004
DE 10 2006 022 722 11/2007
(Continued)

OTHER PUBLICATIONS

International Search Report and Written Opinion for PCT/IB2013/052393 dated Nov. 8, 2013.

*Primary Examiner* — Nathan L Van Sell
(74) *Attorney, Agent, or Firm* — Workman Nydegger

(57) ABSTRACT

A method for manufacturing a laminate panel, where in a first step a press element is manufactured showing a surface relief. In a second step by means of the press element a relief is formed in a surface of the laminate panel, where the surface relief of the press element is provided with protrusions, which during pressing form recesses in the surface of the laminate panel. The recesses imitate wood pores. When manufacturing the press element, at least a number of the protrusions is made elongate and as such are formed substantially or essentially by a machining treatment with rotating cutting tools.

8 Claims, 6 Drawing Sheets

(51) Int. Cl.

| | |
|---|---|
| ***B44B 5/02*** | (2006.01) |
| ***B44C 1/22*** | (2006.01) |
| ***B44C 1/24*** | (2006.01) |
| ***B44C 3/08*** | (2006.01) |
| ***B44C 5/04*** | (2006.01) |

(52) U.S. Cl.
CPC ................ *B44C 3/085* (2013.01); *B44C 5/04* (2013.01); *B44C 1/222* (2013.01); *Y10T 428/24612* (2015.01)

(56) References Cited

U.S. PATENT DOCUMENTS

| | | | |
|---|---|---|---|
| 9,181,503 | B2 | 11/2015 | Seiler |
| 2010/0112285 | A1 | 5/2010 | Decoene |

FOREIGN PATENT DOCUMENTS

| | | | | |
|---|---|---|---|---|
| EP | 1985463 A1 | 10/2008 | | |
| JP | H11 321064 | 11/1999 | | |
| WO | 97/47834 | 12/1997 | | |
| WO | 01/96689 | 12/2001 | | |
| WO | 2006/06676 | 6/2006 | | |
| WO | WO-2006066776 A2 * | 6/2006 | ............... | B44C 1/24 |
| WO | 2006136949 A2 | 12/2006 | | |
| WO | 2011003966 A2 | 1/2011 | | |
| WO | 2011039665 A2 | 4/2011 | | |
| WO | 2011141849 A2 | 11/2011 | | |

* cited by examiner

LAMINATE PANEL, METHOD FOR MANUFACTURING A LAMINATE PANEL AND PRESS ELEMENT TO REALIZE THE METHOD

CROSS REFERENCE TO RELATED APPLICATIONS

This application is a divisional application of U.S. application Ser. No. 14/390,200, filed Oct. 2, 2014, which is the national stage entry of International Application PCT/IB2013/052393, filed Mar. 26, 2013, which claims priority to Belgian application BE 2012/0224, filed Apr. 3, 2012, which are all incorporated by reference.

BACKGROUND OF THE INVENTION

1. Field of the Invention

This invention relates to a laminate panel, as well as to a method for manufacturing a laminate product, and to a press element, more particularly a press plate, for realizing such method.

More particularly, the invention relates to a laminate panel, wherein this panel consists at least of a substrate and a decor provided on the substrate, protected by means of a transparent synthetic material layer. Said decor and the transparent synthetic material layer form part of the top layer of the laminate panel, wherein the decor can show a coloration or a printed motif, for example, with a wood pattern. Herein, this may relate, for example, to furniture panels, ceiling panels, floor panels or the like, which substantially consist of a MDF or HDF (Medium or High Density Fiberboard) basic panel and a top layer provided thereon, such as a laminate top layer.

2. Related Art

Such laminate products of panels are widely known as such. Herein, the possible printed motif can be printed directly on the core or on a basic plate comprising this core, whether or not by the intermediary of primer layers. However, originally the print can also be provided on a flexible material sheet, such as a paper sheet, wherein said printed material sheet then as such, as a so-called decor layer, is integrated into said top layer of the laminate product. Further, it is known that such panels can be provided with a transparent or translucent synthetic material layer, which forms a protective layer above the printed motif and may comprise, for example, wear-resistant particles, such as aluminum oxide. It is not excluded that this protective layer also comprises a material sheet, such as a paper sheet.

Manufacturing such laminate products or panels can be performed, for example, according to a DPL (Direct Pressure Laminate) or HPL (High Pressure Laminate) technique. In the case of a DPL technique, one or more material sheets provided with resin, amongst which a printed or colored material sheet which forms a decor, is brought, together with the substrate or core material, into a press device, where they, by means of a press element and under the influence of increased pressure and temperature, are connected to each other and to the substrate. In the case of a HPL technique, the top layer is separately formed on the basis of two or more material sheets provided with resin, amongst which a printed or colored material sheet which forms a decor, before the thus obtained top layer is provided on the substrate or core material, for example, by gluing it thereon. Usually, first, by means of these techniques larger laminate plates are formed, which in subsequent treatments are subdivided into smaller units of the desired size.

The invention also relates to laminate panels of the "compact laminate" type. Herein, the substrate as such consists of pressed and resin-impregnated paper sheets and/or cardboard sheets. Preferably, one or more material sheets provided with resin, amongst which a printed or colored material sheet forming a decor, together with a plurality, for example, three to nine, of resin-impregnated paper sheets and/or cardboard sheets for the substrate or core material are brought into a press device, where they are connected to each other by means of a press element and under the influence of increased pressure and temperature.

It is also known, for example, from WO 01/96689, that a relief can be provided in the top layer of such laminate products, whether or not corresponding to the printed decor. To this aim, for example, a press platen or other press element is manufactured, which shows a surface relief, and by means of said press platen then a relief is formed in the surface of the laminate product. The surface relief of the press platen is provided with protrusions which, during pressing, form pores or other impressions in said surface of the laminate product. In this manner, wood pores can be imitated. As known, forming said relief in the surface of the laminate product can be performed simultaneously to and by means of the same press device as forming the laminate top layer. For realizing the protrusions on the press platen, according to the state of the art in particular etching techniques are used when manufacturing them. Such technique is described, for example, in DE 10 2006 22 722. Herein, the portions of the press platen which shall form the protrusions are protected by means of an etching mask, whereas the remaining portions are exposed to an etching agent, which removes material at these places. However, the surface relief obtained in this manner according to the state of the art still leaves much to be desired. The finally obtained recesses still leave a rather synthetic impression.

SUMMARY OF THE INVENTION

The present invention aims at creating new possibilities for relief at the surface of laminate panels and, according to various preferred embodiments thereof, it offers a solution to one or more disadvantages of the state of the art.

To this aim, the invention, according to a first aspect, relates to a laminate panel, wherein said panel consist at least of a substrate and a decor provided thereon, protected at least by means of a transparent synthetic material layer, wherein the synthetic material layer is provided with a relief comprising elongate recesses, with the characteristic that said elongate recesses, over the major part of their length, have a cross-section which is provided with inclined lateral flanks, wherein these lateral flanks both have a flank portion with an inclination of more than 60° and less than 90°, and that the maximum depth over which said flank portions extend is larger than the maximum distance between the respective flank portions, measured in transverse direction and parallel to the plane of the aforementioned panel. Still better, the maximum depth is larger than one and a half or two times said maximum distance. Of course, good effects can also be obtained already even when only one of said flank portions is made inclined, whereas the other flank portion extends approximately perpendicular to the surface of the laminate panel. Said inclination may, of course, also be situated between 70° and 85° or 90°.

This specific geometry of the cross-section of the recesses results in minimizing the reflection of incident light. The interaction of depth and inclined flanks leads to a mirroring reflection of perpendicular or approximately perpendicular incident light. Such mirroring reflection takes place mainly on the bottom of the recess. Due to the geometry of the invention, the possibility is minimized that light will incide directly on the bottom. Further, the possibility that light reflected on the flanks exits the recess in a single move, can be minimized to a large extent. Due to the measures of the invention, the respective recesses give a less glossy appearance and, as a result, will be experienced by the user as less synthetic. By means of the present invention, true imitations of brushed wooden panels or brushed veneer can be obtained.

Preferably, said elongate recesses thus have the shape of wood pores.

According to a preferred embodiment, the minimum distance between the respective flank portions, measured in transverse direction and parallel to the plane of said panel, is smaller than sixty percent and still better smaller than half of said maximum distance between said flank portions. In this manner, the possibility of light reflection via the bottom of the recess is minimized even further.

For said transparent synthetic material layer, preferably use is made of a thermally hardening synthetic material, such as melamine. Thermosetting synthetic materials, or synthetic materials which harden irreversibly with supplied heat, have the advantage that they can be provided with sharp structures in a simpler manner. So, for example, they can be hardened by means of a structured press element, wherein the hardening synthetic material layer adopts the structure of the press element, without a considerable rebound effects. In this manner, a true and controllable negative copy of the press element is obtained.

For the aforementioned decor, preferably use is made of a colored or printed material layer, such as a paper layer. In the case of a printed material layer, preferably a wood pattern is applied. With a colored material layer, preferably the global impression of a varnished wood panel is obtained with the laminate panel, such as the impression of a wood panel which is treated with piano varnish, however, wherein the wood pores remain prominently present. The coloration preferably is performed in white or black.

According to a preferred embodiment, the aforementioned transparent synthetic material layer as such shows a gloss degree of more than 10, or still better of more than 20, measured according to DIN 67530. Preferably, the major part or even the entire surface of the laminate panel shows the same high gloss degree. It is in particular with these embodiments that it is advantageous to minimize the risk of the occurrence of reflections in the impressions. Preferably, also said flanks of the recesses show the same gloss degree. Nevertheless, by the special geometry of the invention a restriction of the reflections in the recess is achieved. The glossy surfaces of the present preferred embodiment can lead to an even truer imitation of varnished wood panels.

Preferably, said maximum depth is 0.1 millimeter or more, or still better 0.3 millimeters, 0.5 millimeters or more.

Preferably, the deepest point of said recess is located above the horizontal plane in which the decor locally extends. In this manner, it is obtained that the decor is not penetrated or otherwise damaged by the deep impressions. Preferably, the decor, over the entire panel, substantially or exclusively extends in said horizontal plane.

Preferably, said lateral flanks, at the entrance of said recess and above the respective inclined flank portions, are made with a rounding, wherein said rounding has a radius of less than 0.2 millimeters, or still better of less than 0.1 millimeter. With such embodiment, an even less synthetic impression of, amongst others, imitation wood pores can be obtained.

Preferably, the length of said recess is at least 10 times or 100 times said maximum distance between the respective flank portions.

Preferably, the synthetic material layer of the laminate panel of the invention has a globally flat surface, with the exception of said recesses or other recesses of comparable surface dimensions. Preferably, said recesses are distributed over the panel surface in an approximately uniform manner, however, preferably all oriented with their longitudinal direction in the same direction. In this manner, a wood structure of so-called plain-sawn timber can be imitated in an appropriate manner. According to another possibility, said recesses are distributed in paths or in, whether or not closed, loops or flames. In this manner, a wood structure of so-called quarter-sawn timber can be imitated in an appropriate manner.

Preferably, said recesses are oriented with their longitudinal direction substantially in one and the same direction.

When applied, said flank portions show a constant inclination and/or are realized without abrupt inclination changes.

The invention further also aims at an alternative method for manufacturing laminate panels, which, according to various preferred embodiments, can lead to laminate panels with new relief structures. To this aim, the invention, according to a second independent aspect, relates to a method for manufacturing a laminate panel, wherein in a first step a press element is manufactured showing a surface relief, and wherein in a second step by means of this press element a relief is formed in a surface of the laminate panel, wherein said surface relief of the press element is provided with protrusions, which during pressing form recesses in said surface of the laminate panel, said recesses imitating wood pores, with the characteristic that, when manufacturing the press element, at least a number of said protrusions are made elongate and as such are formed substantially or essentially by means of a machining treatment with rotating cutting tools. Preferably, also the intermediate, lower situated region between two or more of the protrusions is formed substantially or essentially by means of a machining treatment with rotating cutting tools. Preferably, an essential part of said surface relief, for example, more than 50 percent or even more than 75 percent of the respective surface of the press element, is formed by means of a machining treatment with rotating cutting tools. It is not excluded that one or more post-treatments can be performed on the cut surface, for example, a post-treatment which removes undesired height differences, a post-treatment which adjusts the gloss degree of the cut surface, a post-treatment which determines the wear resistance of the cut surface, such as providing a chromium layer of a whether or not uniform gloss degree.

From WO 2006/0066776, it is known as such to apply rotating cutting tools for structuring press elements. However, for the finest relief up to now always a chemical etching technique has been used. The inventor has found that applying rotating cutting tools can also be applied for realizing finer protrusions. Preferably, the method is applied for manufacturing laminate panels with the characteristics of the first aspect or the preferred embodiments thereof, wherein the protrusions, which as such are formed substantially or essentially by means of the machining treatment, lead to a recess in the surface of the laminate panel with the described there particular cross-section, which contributes to minimizing reflections.

Preferably, use is made of rotating cutting tools having a diameter of 3 millimeters or less, for example, of 1.5 millimeters, 1 millimeter or less, such as, for example, of such finger cutters.

The inventor has realized that possibly, problems may arise when milling larger press elements, for example, press elements having a surface to be structured of more than half a square meter, and, even more so, having a structured surface of more than one square meter. These problems are linked to the wear of the applied rotating cutting tools. So, for example, the cutting tools must be exchanged with excessive wear. Such exchange can lead to the occurrence of undesired height differences or other undesired surface effects. For offering a solution to this problem, according to the invention preferably one or more of the following possibilities are applied:

- The possibility of forming the surface to be structured in different steps, wherein one or more finishing treatments follow one or more roughing treatments, wherein the quantity of material to be machined per rotation of the cutting tool and/or the diameter of the milling tool is smaller in said finishing treatment than in said roughing treatment. Preferably, the final milled surface of the press element largely is formed by means of at least one such finishing treatment. Preferably, at least during this final finishing treatment rotating cutting tools are applied having a diameter of 3 millimeters or less, for example, 1.5 millimeters, 1 millimeter or less. Preferably, the final finishing treatment leads to a cut surface with an average roughness of less than 3 or even of less than 1.5 μm Ra. Of course, it is not excluded that this milled or machined surface also is subjected to one or more post-finishing treatments. Preferably, such post-finishing treatment leads to a similar or smaller roughness.
- The possibility of subdividing the surface to be structured into at least two sections having a surface relief which is independent from each other. In the case of press elements for producing laminate panels, from which smaller panels, such as floor panels or furniture panels, are obtained by dividing them, the surface of such section preferably approximately corresponds to the surface of one or more of such panels. In consideration of the fact that the sections have an independent surface relief, a tool change can be performed in the transition between these sections. This transition then preferably corresponds to a material portion of the laminate panel which has to be removed, for example, a portion which has to be removed when subdividing the laminate panel. According to another example, the transition corresponds to a distinctive surface characteristic of the final panel, for example, to a joint which is imitated on the panel surface. Preferably, the final milled surface of each section is formed by only one rotating tool, preferably during a finishing treatment. Thereby, it is obtained that the surface can be free from possible height differences created as a result of a tool change. It is evident that the herein above-mentioned possibility of roughing treatments and finishing treatment can be applied for one or more of said sections.
- The possibility of performing a post-treatment on the milled surface at least locally and preferably exclusively locally by means of another material-removing technique than by means of rotating cutting tools. For example, possible height differences can be minimized by post-sparking, whether or not locally, post-etching, post-laser treatment and so on, wherein in this post-treatment a minimum quantity of material is removed from the milled or machined surface. Preferably, herein the global roughness of the surface is not or hardly affected. Preferably, such local post-treatment is only performed on the lower-situated regions which are located between the protrusions formed by means of the milling treatment.

Preferably, the laminate panel is composed, by means of a press treatment, of a substrate and one or more material sheets, wherein in the same press treatment said press element is applied and the respective recesses are formed in the surface of the laminate panel. Preferably, this relates to the DPL technique described in the introduction.

Further, the invention relates to a press element, more particularly a press platen, with the characteristic that it has elongate protrusions, which are substantially or essentially formed by means of rotating cutting tools.

Below, further another inventive method is described for manufacturing laminate products or laminate panels. Herein, the invention, according to a third independent aspect, relates to a method for manufacturing a laminate product, of the type wherein a press platen is manufactured, which shows a surface relief, and by means of this press platen a relief is formed in the surface of the laminate product, wherein said surface relief of the press platen is provided with protrusions, which during pressing form pores in said surface of the laminate product, which imitate wood pores, with the characteristic that, when manufacturing the press platen, at least a number of said protrusions are made in an elongate shape and as such are formed by means of at least two etching cycles, wherein per such protrusion a first etching mask and a second etching mask, respectively, are applied, having mutually differing, however, overlapping contours, wherein the difference between said first and said second etching mask consists at least in that the second etching mask, over the major part of the length of the respective protrusion, is smaller than the first etching mask and that the second etching mask, at least at one extremity of the respective protrusion, extends farther than the first etching mask.

It is noted that this method does not comprise any limitation in respect to the specific sequence in which the different etching masks are applied. As will be clear below, according to preferred embodiments the second etching mask is applied after the first etching mask.

It is clear that said etching masks are not simultaneously present on the respective protrusion to be formed, but each are applied individually for the respective etching cycle.

By working with at least two individual etching cycles in which a different etching mask is applied, it is possible, according to the invention, to obtain sharper protrusions on the press element or the press platen, which then in their turn can lead to more natural imitations of wood pores at the surface of a laminate product. As the second etching mask, at least at one extremity of the respective protrusion, extends farther than the first etching mask, it can be obtained that the shape of the respective extremity is determined exclusively by this second, globally narrower etching mask. The portion of the second etching mask which, on at least one extremity and preferably on both extremities of the respective protrusion, extends farther than the first etching mask, preferably is made smaller than the global width of the first etching mask. Preferably, the etching cycle performed by means of the second etching mask is realized to a lesser depth than the etching cycle performed by means of the first etching mask. All these measures, each in its turn or in combination, contribute to forming shaper extremities on the respective protrusion. As etching is performed up to a lesser depth, the contour of the second etching mask can be followed better, or, in other words, there will be less underetching of the respective etching mask. Hereby is meant that the risk can be minimized that the etching agent effects laterally underneath the respective etching mask.

For conserving the relief obtained by means of said second etching mask, it is preferred that the second etching cycle is performed after the first etching cycle, whether or not following directly thereafter. It is clear that, if this sequence is not maintained, the relief obtained by means of said second etching mask can be etched again by the subsequent etching cycle by means of the first etching mask. Preferably, no etching cycle effecting on the respective extremity of the respective protrusion will follow said second etching cycle.

It is clear that between the etching cycles other operations can be performed on the press element or the press platen, such as a polishing treatment. A polishing treatment can render a possible stepped shape present in the surface relief at least partially more vague. Such stepped shape can be formed, for example, by applying a plurality of etching cycles, in which etching masks gradually getting smaller are applied.

It is clear that the aforementioned etching cycles are not necessarily the only etching cycles which are applied on the respective press element. So, before, in between or following to the aforementioned two etching cycles, still further etching steps can be applied, for example, for obtaining a so-called substructure.

The methods of the invention are particularly useful when razor-sharp imitation wood pores have to be formed in the surface of the laminate product, for example, with imitation wood pores, the maximum depth of which is larger than the maximum distance between the flanks measured in transverse direction and parallel to the plane of the panel. Preferably, in the case of the third aspect, said first etching mask as well as said second etching mask have an elongate shape, the length of which showing at least fifty times the global width thereof. It is not excluded that by means of this technique laminate panels can be formed having the characteristics of the first aspect of the invention, wherein at least a number of recesses have a cross-section with the mentioned there specific geometry, which can minimize light reflections.

It is clear that the improved design of the respective extremity of the protrusion is also desirable on the other extremity thereof. Therefore, on both extremities of the respective protrusion, the second etching mask preferably extends farther than the first etching mask, wherein this second etching mask then, on this second extremity, too, shows a portion which is narrower than the global width of the first etching mask.

Preferably, at least said second mask is provided on the press platen by means of a printing technique. Herein, the respective mask preferably is composed on the press element, preferably by means of a digital printing technique or wax or lacquer. Such printing technique is described, for example, in the already mentioned DE 10 2006 022 722. For the first mask, which preferably is less fine than the second mask, the same technique can be applied or any other technique can be used, such as the technique wherein the press element is covered with a light-sensitive substance and this substance is hardened by means of exposure to light, for example, through a film, and wherein possibly not hardened substance is rinsed away. Further possibilities for realizing etching masks, which can be applied for realizing the first etching mask as well as for realizing the second etching mask, are described, for example, in WO 2006/066776.

Preferably, when manufacturing the press platen, at least a number of said protrusions are realized by means of only one of said two etching cycles. The presence of protrusions which are obtained by both etching cycles, as well as protrusions which are obtained by only one of the two or possibly by still another etching treatment, leads to a high diversity in shape and size of these protrusions and the imitation pores finally formed thereby in the laminate surface. Further, it is also possible that a substantially global structuring is performed on the surface of the press element or the press platen, whether or not by means of an etching treatment. In this manner, for example, a matte or glossy press platen surface can be achieved. It is also possible to obtain major level differences in the press platen surface by means of a machining treatment, such as milling. Such treatment preferably is started before starting said two etching cycles.

Following the etching treatment, a chromium treatment can be applied, or the press element can be provided with a scratch-proof coating. Such treatments can also be applied in combination with the method of the second aspect, wherein the respective treatment then preferably is performed directly on the surface of the press element, which surface is obtained by means of the cutting treatment.

It is clear that the invention also relates to a press element, more particularly a press platen, which shows protrusions formed by means of etching processes, such as mentioned in connection with the third aspect or in the detailed description. It is clear that herein this does not necessarily have to relate to a flat press platen, but that this may also relate to a press belt, for example, for producing HPL, or a press roll.

The pores formed according to all aspects of the invention may or may not follow the possible aforementioned wood pattern or can coincide with portions thereof, such that the recesses or impressions formed in the laminate surface are, as it were, in register with this wood pattern. Performing impressions in register with a printed decor is known as such, for example, from WO 01/96689. It is noted that forming very sharp imitation wood pores is very interesting when imitating, for example, merbau or oak.

As aforementioned, the laminate panel according to all aspects of the invention preferably comprises a DPL top layer, wherein said printed decor is provided on a paper sheet or other material sheet, a so-called decor layer, which is taken up in the top layer. It is clear that further preferably also a transparent or translucent synthetic material layer is provided above the decor layer as a protective layer, which, for example, can comprise aluminum oxide. Any aluminum oxide preferably is particle-shaped. It is not excluded that this protective layer also comprises a material sheet, such as a paper sheet.

According to a variant, the laminate panel of the invention can be made entirely or almost entirely of paper sheets and/or cardboard sheets impregnated in thermosetting resin. Herein, this then relates to panels of the compact laminate type. Here, too, the panel preferably comprises a printed decor, which is provided on a paper sheet or other material sheet, a so-called decor layer. It is clear that further preferably also a transparent or translucent synthetic material layer is provided above the decor layer as a protective layer, which can comprise, for example, aluminum oxide. It is not excluded that this protective layer also comprises a material sheet, such as a paper sheet.

The laminate product of the invention may relate, for example, to a rectangular floor panel, wherein this floor panel is provided with two pairs of opposite edges, and wherein this floor panel, on at least one pair of opposite edges and preferably on both pairs of edges, is provided with mechanical coupling means allowing locking two of such floor panels to each other, in a vertical direction perpendicular to the plane of the coupled floor panels as well as in a horizontal direction perpendicular to the respective edge and in the plane of the floor panels. Such coupling means are known as such, for example, from WO 97/47834.

According to another possible embodiment, the laminate panel of the invention is performed with a thermoplastic top layer, for example, with a top layer on the basis of polyvinyl chloride (PVC), polypropylene (PP) or polyurethane (PU). Herein, this may relate, for example, to a panel of a heterogeneous vinyl floor covering, wherein this panel consists at least of a substrate on the basis of PVC, preferably on the basis of soft PVC, and a printed decor provided thereon, protected by a transparent synthetic material layer on the basis of PVC, preferably soft PVC. Such panel is known, for example, as LVT (Luxury Vinyl Tile). For the decor, use can be made of a printed synthetic material film, such as a printed PVC foil. The recesses with the geometry of the first aspect and the preferred embodiments thereof contribute to a considerable extent to a more realistic overall impression of such panel. The thermoplastic nature of the top layer in fact provides for a rebound effect, however, due to the specific geometry of the first aspect still a convincing relief is obtained. It is evident that similar effects are obtained with panels having a top layer composed on the basis of PP or PUR.

According to still another possible embodiment, the laminate panel of the invention substantially is made as a pressed mixture of at least wood particles and thermosetting synthetic material. In such case, the decor can be formed by pigments which are comprised in said mixture, and/or by means of a print performed on the not yet pressed mixture, by means of at least pigments. By means of such mixture, a relatively thick colored layer can be obtained, for example, a layer of 0.5 millimeters or more, such that a separate transparent synthetic material layer is no longer necessary. In such case, the relief of the first aspect is formed directly in said mixture. The mixture can be provided of particle-shaped aluminum oxide for increasing the wear resistance.

BRIEF DESCRIPTION OF THE DRAWINGS

With the intention of better showing the characteristics of the invention, herein below, as an example without any limitative character, some preferred embodiments are described, with reference to the accompanying drawings, wherein.

DETAILED DESCRIPTION OF THE INVENTION

Figure 1:
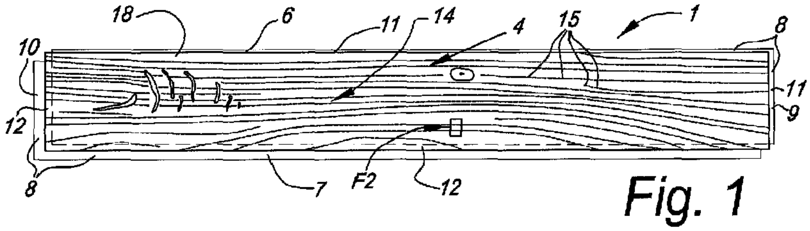
FIG. 1 represents a laminate panel with the characteristics of the invention.
Figure 2:
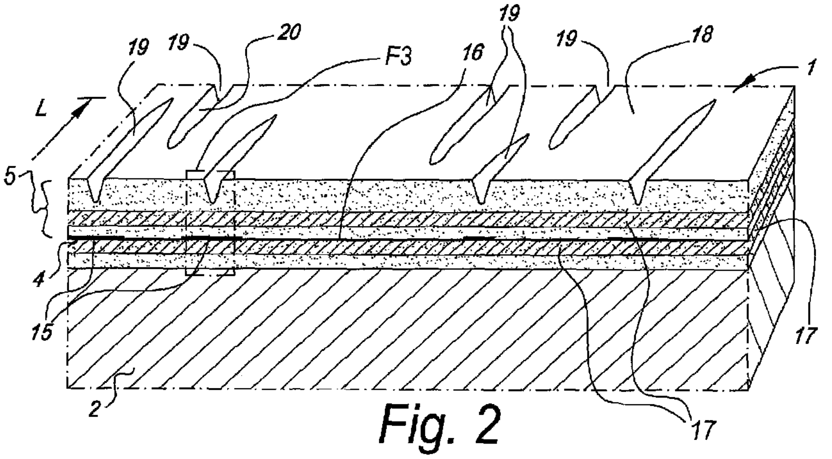
FIG. 2 in perspective, in cross-section and at a larger scale represents a view on the region indicated by F2 in FIG. 1.

FIG. 1 represents a laminate panel 1 with the characteristics of the invention. In this case, this relates to a floor panel which, as FIG. 2 clearly represents, comprises at least a substrate 2 and a top layer 3 present on this substrate 2. As FIG. 2 schematically represents, the top layer 3 comprises a printed decor 4, protected by means of a transparent synthetic material layer 5.

In the present case, the floor panel 1 is provided with coupling means 8 on at least two opposite sides 6-7. Such coupling means preferably allow coupling two of such floor panels 1 to each other, in such a manner that in the coupled condition a connection between these floor panels 1 is created in a vertical direction perpendicular to the plane of the coupled floor panels 1, as well as in a horizontal direction perpendicular to the respective coupled sides 6-7. Here, this relates to coupling means 8 which are integrated in the floor panel 1. In this case, they are even made in one piece with the floor panel 1, more particularly in one piece with said substrate 2. Such coupling means 8 of course may also be present on the short sides 9-10 of the floor panel 1. The coupling means 8 preferably substantially consist of a tongue and groove connection, wherein the tongue and the groove are provided with locking elements, which, in the coupled condition of two of such floor panels 1, effect said connection in horizontal direction.

Figure 3:
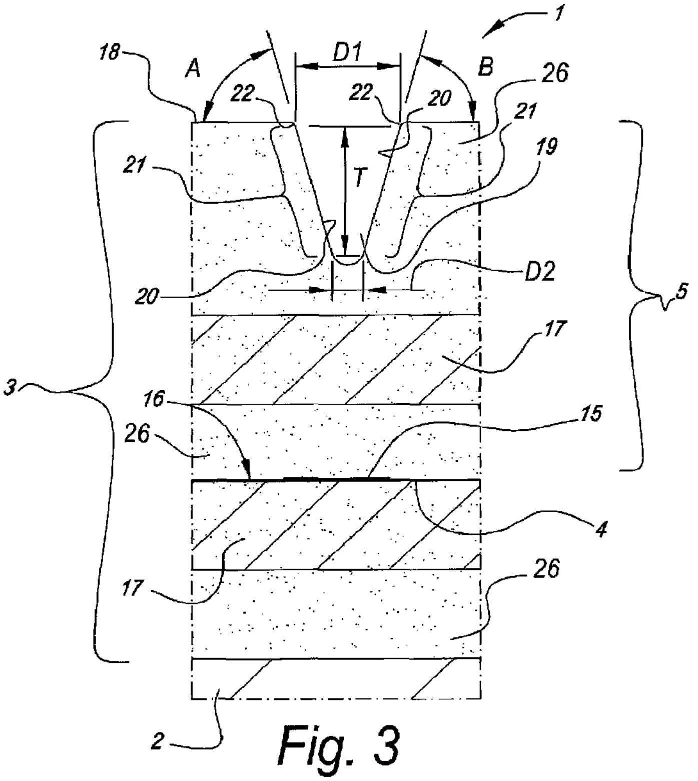
FIG. 3, at a still larger scale, represents a view on the region indicated by F3 in FIG. 2.

FIG. 1 clearly shows that the decor 4, in this case a printed decor, of the floor panel 1 shows a wood pattern 14, wherein this pattern 14 represents, among others, wood pores 15. As FIG. 3 represents, the printed decor 4 is formed as a print 16 performed on a material layer 17, such as a paper sheet, which is located on the substrate 2. As a substrate 2, preferably a wood-based substrate is applied, such as MDF or HDF (Medium Density Fiberboard or High Density Fiberboard). Other substrates 2, such as substrates which substantially consist of synthetic material, are of course not excluded. For example, in the case of compact laminate, this may relate to a substrate comprising a plurality of resin-impregnated and pressed paper sheets and/or cardboard sheets. In the case of LVT, this may relate to a substrate on the basis of soft PVC, which possibly comprises fillers, such as lime.

In the example, the surface 18 of the floor panel 1 is formed by said synthetic material layer 5, which, for example, such as here can comprise a thermosetting resin, such as melamine resin, however, which, preferably as close as possible to the surface 18, for example, within 5 micrometers underneath the surface 18, also comprises hard particles, such as corundum (Al2O3), possibly in the form of nanocorundum. The examples also show that the synthetic material layer preferably comprises a material layer 17, such as a paper sheet. In the production of the laminate panel 1, such material layer 17 may serve as a carrier for at least a portion of the material of the synthetic material layer 5 and the possible hard particles.

FIG. 2 clearly shows that the synthetic material layer 5 of the surface 18 of the laminate panel 1 is provided with a relief which comprises elongate recesses 19.

FIG. 3 represents that the elongate recesses 19, over the major part of their length L, have a cross-section which is provided with inclined lateral flanks 20, or at least with one inclined lateral flank 20. Herein, at least one of these flanks 20, and preferably both flanks 20, comprise a flank portion 21 having an inclination A-B of more than 60° and less than 90°. Herein, the maximum depth T over which said flank portions 21 extend is larger than the maximum distance D1 between the respective flank portions 21, wherein this distance D1 is measured transverse to the length L of the elongate recesses 19 and parallel to the plane or the surface 18 of said panel 1.

In the example of FIG. 3, the minimum distance D2 between the respective flank portions 21, measured in transverse direction and parallel to the surface 18 of the laminate panel 1, is smaller than half of said maximum distance D1 between these flank portions 21. The deepest point of the respective recess 19 is located above the horizontal plane in which the decor 4 extends. In this case, this deepest point is even located above the horizontal plane in which the material layer 17 of the synthetic material layer 5 extends. At the entrance of said recess 19 and above the respective inclined flank portion 21, the lateral flanks 20 are made with a rounding 22, the radius of which is less than 0.2 millimeters.

Figure 4:
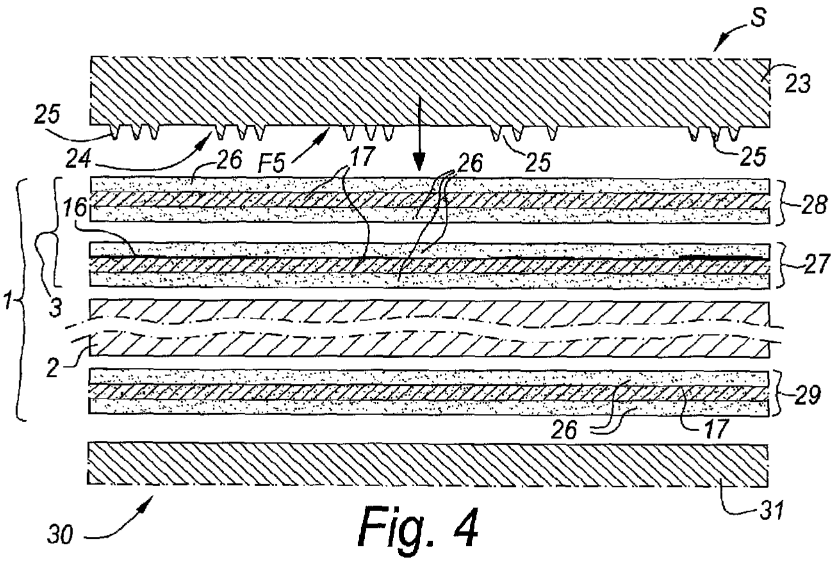
FIG. 4 schematically represents a step in a method according to the invention.

FIG. 4 schematically represents a step S, wherein by means of a press element 23 a relief is formed in a surface 18 of a laminate panel 1. To this aim, the press element 23, prior to the press treatment, is provided with a surface relief 24 which comprises protrusions 25. When performing the press treatment, these protrusions 25 form recesses 19 in the surface 18 of said laminate panel. The obtained recesses 25 imitate wood pores.

The pressing step S represented in FIG. 4 relates to an application of the so-called DPL method, wherein the laminate panel 1, at least by means of a press treatment, is composed of a separate substrate 2 and one or more separate material layers 17 or material sheets 17. Herein, said press element 23 is applied in that same press treatment for forming said recesses 19 in the surface of the laminate panel 1. Preferably, as here, a plate-shaped press element 23 or platen is applied.

FIG. 4 further shows that the material layers 17 are provided with synthetic material 26, preferably a thermally hardening synthetic material, such as a melamine-containing synthetic material. Apart from a first layer 27, which comprises the decor 4, and a second layer 28, which forms part of said transparent synthetic material layer 5 and preferably substantially forms the latter, these material layers 17 provided with synthetic material further also comprise a backing layer 29 or balancing layer.

For performing the press treatment S, preferably a press device 30 of the short-cycle type (German: Kurztaktpresse) is applied. Preferably, at the opposite side of said press element 23 also a second press element or lower platen 31 is applied.

According to the second independent aspect mentioned in the introduction, when manufacturing the press element 23, at least a number of said protrusions 25 are made elongate and are formed as such substantially or essentially by means of a machining treatment with rotating cutting tools. Preferably, protrusions 25 are formed, which during pressing effect recesses 19 of the particular type of the first aspect of the invention mentioned in the introduction.

Figure 5:
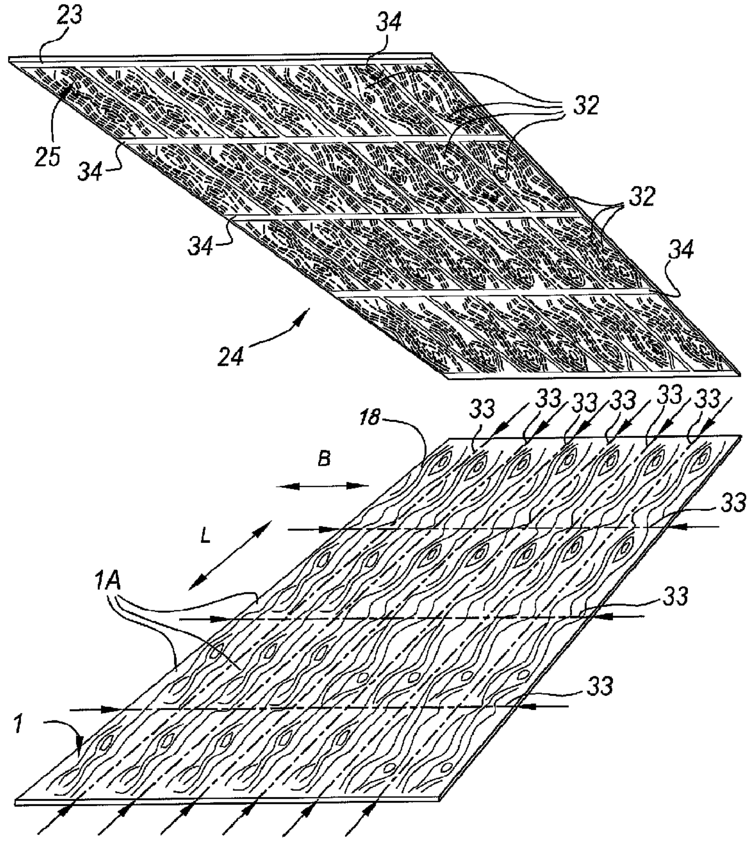
FIG. 5 in perspective, according to the direction F5 indicated in FIG. 4, represents a press element as well as a laminate panel as those applied in the method of FIG. 4.

FIG. 5 gives a view on a press element 23, which comprises a surface relief 25 with a plurality of sections 32 showing a mutually independent surface relief. FIG. 5 also makes clear that such press element 23 can be applied for producing laminate panels 1, from which, by subdividing, for example, by means of a saw treatment, along one or more dividing lines 33, smaller panels 1A, in this case floor panels, are obtained. When applying the second aspect, the final cut surface of one or more of the sections 32 of the press element 23 is formed by only one rotating cutting tool, preferably during a finishing treatment. The possibly necessary tool exchange then can take place in the transition 34 between two of these sections 32. Preferably, these transitions 34, such as here, correspond to material portions of the laminate panel which have to be removed. In this case, the transitions 34 correspond to the dividing lines 33, wherein the transitions 34, however, may be realized wider than the dividing lines 33.

Figure 6:
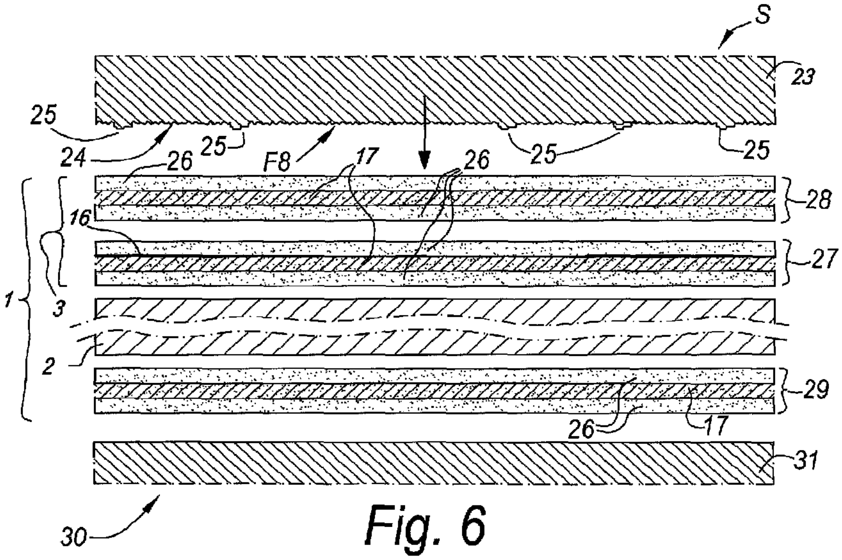
FIG. 6, in a view similar to that of FIG. 4, schematically represents a step in an alternative method according to the invention.

FIG. 6 represents an alternative step S in a method for manufacturing a laminate product 1, wherein this method shows, amongst others, the characteristics of the third aspect mentioned in the introduction. Herein, this relates, by way of example, to a laminate panel 1 of the DPL type, wherein a substrate 2, a decor layer 27, a protective layer 28 and a backing layer 29 or balancing layer are consolidated in a press device 30 between a lower press plate 31 and an upper press plate 23. The decor layer 27 comprises a printed decor 4 and, after pressing, together with the transparent or translucent protective layer 28 forms the top layer 3 of the laminate panel 1. The decor layer 27 as well as the protective layer 28 or overlay substantially consist of a material sheet 17 provided with resin 26, such as a paper sheet. The backing layer 5 or balancing layer provided on the underside also substantially consists of a material sheet 17 provided with resin 26, such as a paper sheet. The substrate 2 may comprise, for example, a wood-based substrate, such as a MDF or HDF substrate.

Figure 7:
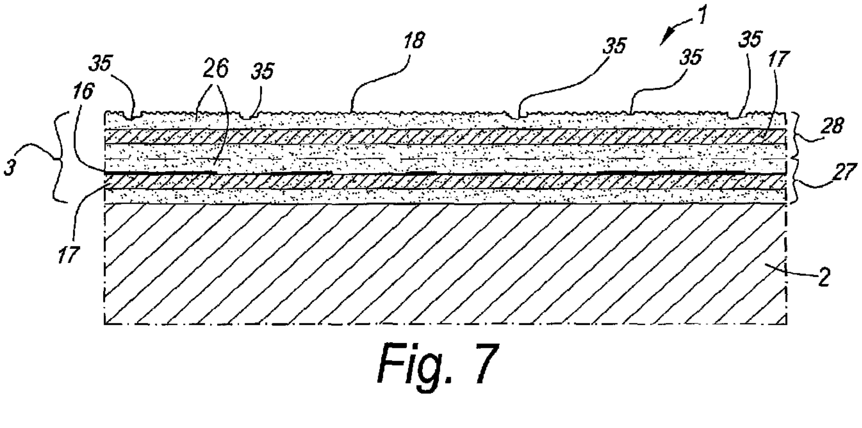
FIG. 7 represents a laminate product which is obtained by means of the method of FIG. 6.

From FIG. 6, it is clear that the method illustrated here is of the type wherein a press plate 23, in this case said upper press plate, is manufactured, which shows a surface relief 24. This surface relief 24 is provided with protrusions 25, which, as becomes clear from FIG. 7, during pressing will form impressions or pores 35 in the upper surface 18 of the laminate panel 1, which, as will become clear below, imitate wood pores. FIG. 6 represents the obtained consolidated laminate panel 1, which in the upper surface 18 shows the relief formed by means of said press plate 23.

Figure 8:
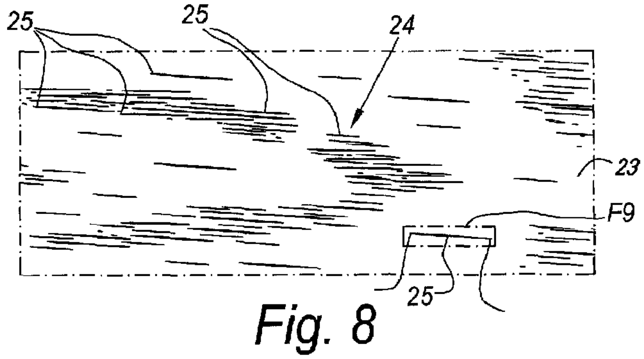
FIG. 8 represents a view according to the arrow F8 indicated in FIG. 6.

FIG. 8 represents the structure of protrusions 25 on the press plate 23. This structure in this case substantially consists of protrusions 25, made in elongate shape, which imitate a wood structure. It is clear that the relief of the press plate 23, according to the second as well as to the third aspect, apart from protrusions 25 in the form of pores, can comprise still other protrusions, for example, protrusions intended for forming an impression in the form of a wood knot, a chamfer or traces of wear.

Figure 10:
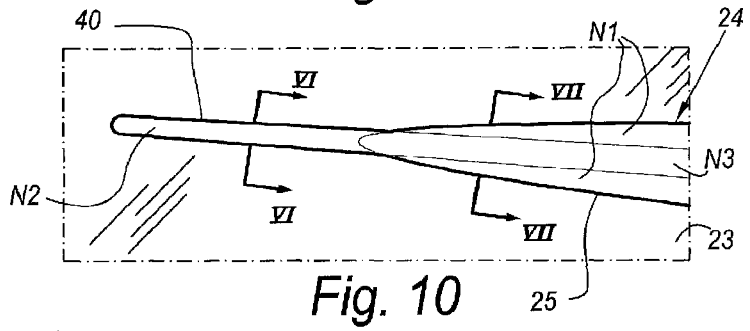
FIG. 10 schematically represents a detail of a press platen with the characteristics of the invention.

The particularity of the present invention according to its third aspect consists in that, when manufacturing the press plate 23, at least a number of said elongate protrusions 25, such as the one in the frame F9, as such are formed by means of at least two etching cycles. FIG. 10 represents that per such protrusion 25 a first etching mask 36 and a second etching mask 37, respectively, with mutually differing, however, overlapping contours are applied. For the sake of simplicity of the comparison, in FIG. 10 both etching masks 36 and 37 are simultaneously represented. From this, it is evident that in the example, as required by the invention according to its third aspect, the difference between said first etching mask 36 and said second etching mask 37 consists at least in that the second etching mask 37, over the major part of the length L1 of the respective protrusion 25 to be formed, has a global width B2 which is smaller than the global width B1 of the first etching mask 36 and that the second etching mask 20, on at least one end 38 of the respective protrusion 25, extends farther than the first etching mask 19. Moreover, the portion 39 of the second etching mask 37, which, at the extremities 38 of the respective protrusion 25 to be formed, extends farther than the first etching mask 36, is made with a smaller width B than the global width B1 of the first etching mask 36.

FIG. 5 represents the contours of the extremity 40 of the protrusion 25, which is obtained when applying the masks 36-37 of FIG. 10. In the example, three levels N1-N2-N3 are obtained in one and the same protrusion 25, namely a level N1, where only the first etching mask 36 has been active, a level N2, where only the second etching mask 37 has been active, and a level N3, where both etching masks 36-37 have been active.

Figure 11:
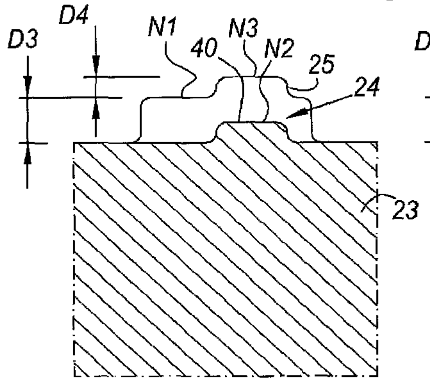
FIGS. 11 and 12, at a larger scale, represent a cross-section according to the lines VI-VI and VII-VII, respectively, indicated in FIG. 9.
Figure 12:
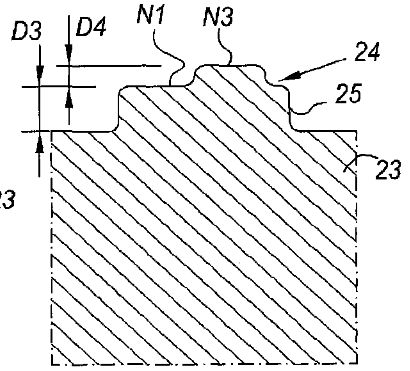
Figure 9:
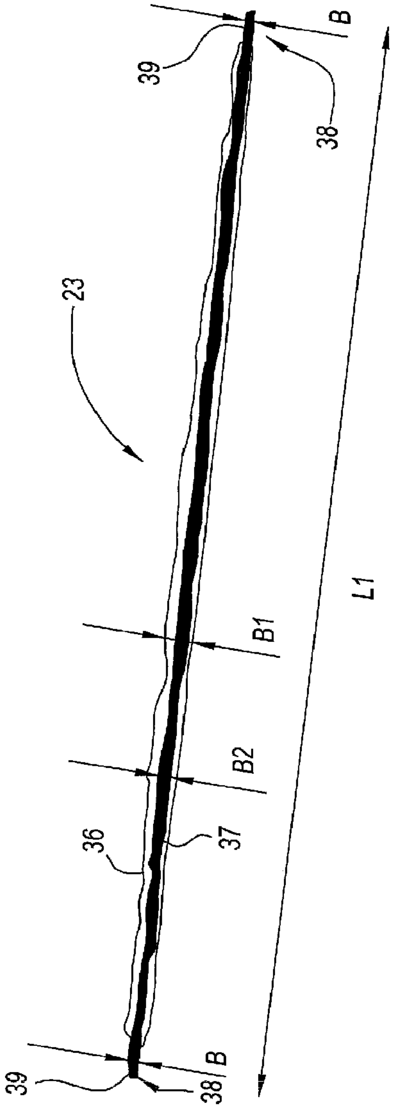
FIG. 9 further illustrates the method of FIG. 6 in a view on the region indicated by F9 in FIG. 8, however, at a larger scale.

FIG. 11 represents a cross-section through a level N2 where only the second etching mask 37 has been active, whereas FIG. 12 represents a cross-section through a zone with different levels N1-N3. From these cross-sections, it is clear that the etching cycle performed by means of the second etching mask 37, in the example is performed over a smaller depth D4 than the depth D3 with which the etching cycle is performed by means of the first etching mask 37. Moreover, it is clear that, by the specific choice of the contours of both etching masks 36-37 and the etching depth D3-D4 thereof, a relatively acute extremity 40 is obtained at the extremity 40 of the protrusion 25, which, in the final laminate panel 1, will lead to an impression or pore 35 which imitates the natural shape of a wood pore in a better manner.

The present invention is in no way limited to the herein above-described embodiments; on the contrary, such methods, laminate panels and press elements can be realized according to various variants, without leaving the scope of the present invention.

The invention claimed is:

1. A method for manufacturing a laminate panel, comprising the steps:

where in a first step a press element is manufactured showing a surface relief, and in a second step a relief is formed in a surface of the laminate panel by the press element, wherein said surface relief of the press element is provided with protrusions, which during pressing form recesses in said surface of the laminate panel, said recesses imitating wood pores, wherein when manufacturing the press element, at least a number of said protrusions is made elongate and as such are formed substantially or essentially;

wherein the method includes forming said at least a number of said protrusions by the step of a machining treatment with rotating cutting tools;

wherein said press element is provided with a structured surface of more than one square meter;

wherein said machining treatment with rotating cutting tools is a milling treatment, and in that a post-treatment is performed on the milled surface locally by a laser treatment;

wherein said post-treatment is only performed on lower-situated regions which are located between said protrusions formed by said milling treatment, said post-treatment removing height differences between the protrusions along surfaces of the lower-situated regions.

2. The method according to claim 1, wherein the laminate panel is composed, at least by a press treatment, of a substrate and one or more material sheets, wherein in the same press treatment said press element is applied and the respective recesses are formed in the surface of the laminate panel.

3. The method according to claim 1, wherein said surface to be structured is structured in different steps, wherein one or more finishing treatments follow one or more roughing treatments, wherein a quantity of material to be machined per rotation of the cutting tool and/or a diameter of the milling tool is smaller in said finishing treatment than in said roughing treatment.

4. The method according to claim 1, wherein said surface to be structured is subdivided into at least two sections having a surface relief which are independent from each other.

5. The method according to claim 1, wherein the protrusions are formed with a cross-section having at least one inclined flank, wherein the at least one flank has at least one of a flank portion with an inclination of more than 60° or less than 90°.

6. The method according to claim 5, wherein the at least one flank has a maximum depth over which said at least one flank portion extends and is larger than a maximum distance between respective flank portions, measured in transverse direction and parallel to a plane of the laminate panel.

7. The method according to claim 1, wherein said surface relief forms more than 50 percent of a respective surface of the press element.

8. The method according to claim 1, wherein all of the surfaces of the lower-situated regions are free from height differences as a result of the post-treatment.

* * * * *